(12) United States Patent
Pliassounov (10) Patent No.: US 8,152,204 B2
(45) Date of Patent: Apr. 10, 2012

(54) FLARED BRAKE TUBE CONNECTOR

(76) Inventor: Stanislav Ivanovitch Pliassounov, Oakville (CA)

( * ) Notice: Subject to any disclaimer, the term of this patent is extended or adjusted under 35 U.S.C. 154(b) by 434 days.

(21) Appl. No.: 12/216,130

(22) Filed: Jun. 30, 2008

(65) Prior Publication Data

US 2009/0015008 A1   Jan. 15, 2009

(51) Int. Cl.
*F16L 25/00* (2006.01)
(52) U.S. Cl. .............. 285/334.5; 285/332.1; 285/386
(58) Field of Classification Search ............. 285/246, 285/332.1, 334.5, 386–387, 389
See application file for complete search history.

(56) References Cited

U.S. PATENT DOCUMENTS

| | | | | |
|---|---|---|---|---|
| 1,804,814 A * | 5/1931 | Schultis | ............. | 285/334.5 |
| 1,894,700 A | 1/1933 | Parker | | |
| 4,585,434 A * | 4/1986 | Cole | ............. | 494/20 |
| 4,842,310 A * | 6/1989 | Muffke et al. | ............. | 285/334.5 |
| 5,529,349 A * | 6/1996 | Gibbs et al. | ............. | 285/332 |
| 5,997,050 A * | 12/1999 | Fleckenstein et al. | ............. | 285/332 |
| 6,527,304 B1 * | 3/2003 | Pliassounov | ............. | 285/334.5 |
| 6,663,146 B1 * | 12/2003 | Sakai et al. | ............. | 285/353 |
| 2006/0049632 A1 * | 3/2006 | Williams | ............. | 285/382 |
| 2007/0194567 A1 | 8/2007 | Pliassounov | | |

* cited by examiner

*Primary Examiner* — Aaron Dunwoody
*Assistant Examiner* — Fannie Kee
(74) *Attorney, Agent, or Firm* — Manelli Selter PLLC; Edward J. Stemberger (57) ABSTRACT

A fluid connector assembly comprising (a) a connector body having an inner concave seat having a portion defining a frustoconical surface; (b) an elongate tube having a flared end; and (c) a nut; wherein the connector body is adapted to receive the elongate tube and the nut to form a substantially rigid connection, and wherein the flared end of the tube and the frustoconical surface of the seat are engaged so as to form a fluid seal between the body and the tube; and wherein the flared end has a portion defining an abutment surface having a borderline region in abutment with the frustoconical surface of the inner seat of the body; and wherein the abutment surface of the flared end is a spherical surface.

8 Claims, 5 Drawing Sheets

FLARED BRAKE TUBE CONNECTOR

FIELD OF THE INVENTION

This invention relates to automotive high-pressure brake tube connectors having an elongated brake tube with a flared end with its external abutment surface which is intended to interact with a concave (female) inner seat of connector's body with the purpose to maintain a fluid-tight seal of the type used in a motor vehicle to actuate the braking system.

BACKGROUND TO THE INVENTION

A connector arranges the proper mutual positioning and clamping force between flare and port. The intended for sealing flare's surface (which is an integrated part of flare's abutment surface) mates with its counterpart onto the port's seat and creates the seal. Currently, there are two families of standardized mass-produced brake connectors utilized in automotive industry.

The first class is based on the interaction of a male type (convex) seat situated inside connector's port (hole/recess) and extending into it. Accordingly, a female (concave) flare with its inner surface dedicated for abutment against the seat with the purpose of forming the fluid seal, is required. This class is represented by the JASO/SAE connector design. Its nominal sealing surfaces' shape is a frustum (portion of a cone with cut off vertex). Its double inverted flare (funnel or trumpet) has inner (concave) frustum which is intended for sealing onto "external" (convex) frustum (seat) of the port. The design is defined by SAE J533 and JASO F402 standards (which are similar to each other).

The second class of tube flared connectors incorporates the reversed combination—a female type (concave) seat interacting with a male type (convex) flare. This class is represented by the ISO connector design. It incorporates the flare (bubble) with its external surface dedicated for abutment against the seat with the purpose of forming the fluid seal. Nominal shape of its sealing surface is also frustoconical. The frustoconical concave seat is an integrated part of the connector port (hole/recess)—there is no any portion extending into the port. The ISO design is defined by the SAE standard J1290.

Good and robust connector sealing may be expected only if adequate clamping force is developed onto the contact ring of sufficient size between the sealing surfaces. There is a fundamental shortcoming of frustum to frustum mating. A ring of contact may be expected only if the axes of both the flare and the port coincide. Otherwise, it is common that the result of cone frustum side surfaces crossing (i.e., having a geometry entity which belongs to both frustums) is just a single point. Typically a connector has to provide some degree of robustness, since a ring-like shaped initial contact may not be always anticipated. Certain amount of self-adjustment or reasonable sustained deformation during connector's securing is expected when initial contact takes place at a single point. That usually corrects the mutual positions of the components toward development of a ring-like contact area between the flare's and the seat's sealing surfaces. However, there are certain known limitations of the degree of robustness of current state of the art frustum-to-frustum connectors.

Under certain conditions friction may lock the flare in a misaligned state against port's seat. Simply put, if the initial contact occurs on a single point, then the flare gets locally squeezed there between the nut and the port. If the effective friction coefficient at that squeezed area becomes greater than certain threshold then the flare gets locked. Such locking inhibits self-adjustment as mutual motion of the components becomes restricted, and extra torque is not able any more correct poor initial contact into an uninterrupted ring-like line. At the same time reasonable torque increase may also become not sufficient to provide the deformation, which becomes required to close the gap between the sealing surfaces. In this case further torque increase leads to squashing of joint's components, which in turn may permanently preclude development of the seal.

There are two groups of causes, which are potentially able to lead to a single point initial contact. First group is related to misalignment of the frustums (and this is applicable even if the frustums have ideal shapes without deviations/defects). This group of causes is usually associated with an external disturbance. Usually some degree of initial misalignment is unavoidable and requires some extra torque to overlap the misalignment by connector's self-adjustment. An external disturbance may increase initial misalignment or cause difficulty to correct it. For example a side force, applied onto the tube in the direction which helps to increase that initial misalignment, unfavorably changes the balance of the forces into the connector. Accordingly more extra torque becomes necessary for additional self-adjustment (sufficient to overlap new balance of the forces caused by that disturbance). Generally an external disturbance consumes certain portion of connector's available self-adjustment capacity and therefore increases chances of initial single point contact and further locking. The second group of causes is related to common manufacturing process variations and defects. A single point initial contact between the frustums (alternatively, sort of a chain of single points) may also occur because of deviations from their intended shapes or defects even if the frustums are perfectly aligned. On top of that some local defects (sharp edges, scratches, bulges, chips etc) at the single point of contact greatly increase effective local friction. Accordingly those defects may greatly inhibit connector robustness leading to significant increase of the probability of locking.

The following details regarding flare endforming process are useful for understanding innate disadvantages of the existing art comparing with the present invention.

By the design intent ISO flare's cone angle is always less than port's one. Therefore when ISO flare mates with its port, initial contact is supposed to occur at the small flare frustum diameter (flare's end around tube's passageway hole). However the very same flare's area is most vulnerable to deviations. This area is basically the former surface of the tube's tip prior to the endforming (a process to form up a flare onto "raw" tubing). Tube's tip is very dependent on quality of the cutting off operation, which is necessary to obtain required tube length. Plain conditioning of tube's tip surface after the cutting off operation (brushing, chaffering etc) can not assure ideal circumference there and its perpendicularity to tube's axe. The coining (another conditioning process, which is well known as effective way to obtain precise surface) cannot be applied at this area, as no buttress is available inside flare's "bubble" during the endforming process. Ambiguity of tube tip surface is also combined with variation of the endforming process. Essentially, current manufacturing practice provides limited capability to form flare's area around passageway hole of the tube. The SAE standard J1290 also admits such unpredictability. Its drawing, which defines ISO flare geometry, notes the area around passageway hole "as formed". That is serious disadvantage of the ISO flare. This is the most important portion of its sealing surface, which is intended to be the datum while mating, and which coincides with one of the less predictable area of the flare. Unavoidable deviations and defects there directly responsible for interrupted line of the initial contact and corresponding difficulties to develop the seal.

The other type (SAE/JASO double inverted flare) also has unpredictable "as formed" area around its small frustum diameter. The endforming process shapes double inverted flare in such a way that the metal into the die flows "with the funnel" i.e. toward small frustum diameter. Only in case of maximum material condition it is possible to expect the minimum size of small frustum diameter (i.e. on its lower specification limit). Otherwise its actual size very depends on actual amount of the metal, which is available within the die. The size also depends on how much the tooling is worn out. Thus it is more probable to get bigger actual size of that diameter. Both specifications (SAE and JASO) also admit unpredictability there and stipulate relatively loose tolerance for this diameter. For the most popular tube sizes of 5/16" and 1/4" the allowance is 0.75 mm by the SAE standard and 0.70 mm by the JASO, which is comparable to the nominal size of 1.1 mm of sealing surface seat length. That is why actual small diameter of flare's frustum can either be greater or smaller than the small diameter of seat's frustum. Accordingly it is possible to have two different ways of mating.

If the actual size of the seat's frustum small diameter is greater than the flare's one then initial contact occurs by the seat's top somewhere onto the sealing surface of the flare. That is a preferred way of mating because this is the smooth coined sealing inner surface of the flare which makes initial contacts with the seat. Accordingly the probability of locked misalignment is very low and full-scale connector's self-adjustment capacity can be expected.

The other (unwanted) way happens if seat's diameter is less than flare small frustum diameter. In this case initial contact occurs by the flare's small frustum diameter somewhere onto the seat. Unfortunately this is quite probable due to mentioned above limited capability of the manufacturing process. On top of unpredictability of the size of flare's small diameter it is also quite probable to get a defect or deviation there. And as it was explained before a local defect (sharp edge, scratch, bulge, chip etc) may greatly increase effective local friction. Moreover, lack of available metal during endforming may become "asymmetrical" which in turn can lead to uncompleted circumference around actual small diameter area. As the result flare frustum may get either voided or skewed around its small diameter. Such incomplete circumference may nevertheless become fit to service as actual datum during mating onto seat's sealing surface. Needless to say, that each void provides a potential leak path, which may or may not be eliminated by additional torque (deformation). Propensity of a defect combined with initial single point contact corresponds to high probability of locked misalignment. Thus, connector's self-adjustment capability may deteriorate significantly resulting difficulties to develop the seal.

On top of the fact that small frustum diameter is an unpredictable "as formed" area, it is very difficult to detect deviations of double inverted flare there. If the small diameter is not completely formed it is hard to define where exactly it should be measured. It is much more complicated than usual to use "inside the tube" generic measurement tools like a caliper on repeatable and reproducible way. Because of cost related reasons and lack of criteria for thoroughness of that diameter, all available technologies like machine vision systems, laser scanning, X-ray etc are not utilized as an in-process 100% check. Current industry wide practice rather relies on manual sorting on as needed basis. Unfortunately current manufacturing and quality control practices allow relatively easy escape for defects and deviations at this "as formed" area of JASO/SAE flare.

The problem of relatively easy escape of a quality defect is also applicable to the JASO/SAE seat. It is also difficult to control the shape and the dimensions of such seat and its surrounding area because of their "inside the hole" location. On top of that, a convex (male) seat situated inside of its port has many other disadvantages against a concave (female) integrated into its port one.

The shape of a male seat extending into the port is obviously more complex than a female one, and it, thus, requires more steps to manufacture a male seat. The parts are typically formed using a metal cutting process. The female port according to the present invention requires a step to form the hole for the port, a step to cut the thread into the hole and a last step to finish the bottom portion of the hole to make it suitable for usage as a seat. A male seat, as taught by JASO/SAE, requires all of the above steps plus forming and finishing steps for the part of the seat extending into the port. Even when rolling and cold forming technologies may help to combine some of the operations, the additional body extending into the port invariably requires extra steps.

Correspondingly, the tooling to manufacture a female seat port according to the present invention is simpler, and, thus, less expensive.

Regarding the quality control of finished products, the female seat port according to the present invention is more easily controlled than a male seat extending into the port. Controlling an internal seat requires special equipment to measure and control both dimension and surface roughness internally in the port. Since the female seat is easily accessible from the outside, the quality control is simpler.

Despite of its disadvantages the SAE/JASO ports are still widely utilized because there is a misperception that SAE/JASO flare provides more robustness to the assembly process than the ISO one. Seemingly easy repair in fact hides acquired defect (flow reduction) and may lead to untimely part replacement on the field. Since extra torque engages connector's self-adjustment, it is a common practice to apply increased torque in order to repair connector, if there is a leak. Usage of excessive extra torque is virtually undetectable in case of a convex (male) seat. (In case of the ISO flare excessive torque most likely leads to a crash of the flare and a replacement). A female flare usually envelops seat and eventually translates all the deformations (sustained due to excessive torque) onto the seat. Accordingly initial geometry of such male (convex) seat may get changed significantly which may lead to a substantial reduction of the diameter of the passage, which in turn may cause a considerable decline in flow rate.

The use of a female (concave) seat is superior to the use of a male (convex) seat, and, thus, the use of an external abutment surface of the flare is superior to the use of a flare with internal abutment surface, in terms of sealing capability, flow performance, manufacturing feasibility and quality control. Accordingly usage of the combination of a concave (female) seat with an external (convex/male) flare provides better method to form a fluid-tight seal comparing to the combination of a convex (male) seat with a concave (female) flare.

Correspondingly an improved brake tube flare connector based on the combination of a concave (female) seat with an external (convex/male) flare is needed. Thus, in order to improve sealing robustness by reducing sensitivity to the variations and disturbances, existing male type flare of the ISO design must targeted as the basis and subject for further improvement.

There are two know solutions associated with incorporation of a non-frustoconical shape for the sealing surface. They provide only partial improvement to the existing art as only the misalignment related problem (the first mentioned above group of causes) can be resolved. In theory, a crossing between either two spheres or sphere with cone is always a circumference. Therefore a circumference as initial contact line between the flare and the seat can be expected even if their axes are misaligned within reasonable span. The first one is U.S. Pat. No. 1,894,700, granted Jan. 17, 1933 to Parker, A. L A R. teaching incorporation of zones of sphere for both the flare and the seat. The second one is the US patent application No. 20070194567 published on Aug. 23, 2007. It stipulates incorporation of zone of sphere for the seat only which to be utilized with a standard JASO/SAE flare. Both designs are not resilient to the second group of the causes as unavoidable deviations from ideal shape and local surface defects still make a single point initial contact possible. Besides, both of them belong to the first family of the connectors (based on male/convex seat interacting with female/concave flare). The present invention belongs to the second family (female/concave seat interacting with male/convex flare) enabling the method to form fluid-tight seal, which is superior over the first one.

SUMMARY OF THE INVENTION

Accordingly, in one aspect the invention provides a fluid connector assembly comprising
 (a) a connector body having an inner seat having a portion defining a concave frustoconical surface;
 (b) an elongate tube having a flared end with an external abutment surface; and
 (c) a nut;
wherein said connector body is adapted to receive said elongate tube and said nut to form a substantially rigid connection, and wherein said flared end of said tube and said frustoconical surface of said seat are engaged so as to form a fluid seal between said body and said tube; and
wherein said flared end has a portion defining an external abutment surface having a borderline region in abutment with said concave frustoconical surface of said inner seat of said body and wherein said external abutment surface of said flared end is selected from an external abutment surface forming at least part of a spherical surface and an external abutment surface having a plurality of frustoconical surfaces.

Preferably, the invention provides a fluid connector assembly comprising
 (a) a connector body having an inner seat having a portion defining a concave frustoconical surface;
 (b) an elongate tube having a flared end with an external abutment surface; and
 (c) a nut;
wherein said connector body is adapted to receive said elongate tube and said nut to form a substantially rigid connection, and wherein said flared end of said tube and said frustoconical surface of said seat are engaged so as to form a fluid seal between said body and said tube; and
wherein said flared end has a portion defining an external abutment surface having a borderline region in abutment with said concave frustoconical surface of said inner seat of said body and wherein said external abutment surface of said flared end forms at least part of a spherical surface.

In preferred aspects of the present invention, a run out area, herein referred to as a lip, is present in a brake tube flare having an external (convex/outer) sealing surface. (By the term "sealing surface" in this specification is meant part of flare's abutment surface, which is dedicated to mate with the seat with the purpose of forming fluid-tight seal).

The lip is situated between the sealing surface and flare's end around the tube's passageway hole. The lip is bent further away from the sealing surface towards the inside of the tube, i.e. towards the tube's passageway orifice. The sealing surface and the lip intersect to form, herein termed, a borderline region. The borderline's nominal shape is a circumference.

By the term "borderline region" in this specification is meant a circumferential zone or line of contact between a plurality, i.e. at least two adjacent surfaces which meet at an angle.

In an embodiment of the invention having a double frustoconical surface the borderline region is the circumferential zone of contact between two integrally formed cones of different slopes relative to the frustoconical surface portion of the concave seat.

In an embodiment of the invention having a spherical surface, the borderline region is the circumferential zone of contact between integrally formed spherical surface and frustoconical surface of different slope relative to the frustoconical surface portion of the concave seat.

Thus, in preferred aspects the invention provides an assembly wherein the abutment surface of the flared end is selected from a spherical surface and a plurality of frustoconical surfaces.

In one further preferred aspect, the invention provides an assembly wherein the abutment surface of the flared end is a spherical surface.

More preferably, the invention provides an assembly wherein the abutment surface of the flared end comprises a pair of frustoconical surfaces integrally formed at the borderline region.

The purpose of the lip is to absorb the unpredictable "as formed" area at flare's end. The prior art tube tip having known ambiguity of its geometry, which combined with limited available capability of the manufacturing endforming process, has been deliberately positioned away from the flare's sealing surface. By its definition, the lip is a "spare and free" run-out area, which absorbs unavoidable variation. Therefore, its shape can be of any configuration suitable to provide a circumference as the nominal shape of the borderline region. The preferred nominal shape of the lip is a cone. However, a zone of a sphere, or portion of a torus, or a flat ring perpendicular to tube's axis, or for example a complex combination of all of the above is also suitable. In an extreme case, the lip may even become bent "inside" the passageway hole provided the diameter of the hole is sufficient to support the required fluid flow.

The lip is combined either with a cone-shaped sealing surface or a sphere-shaped sealing surface. Thus, there are two types of the flare according to the invention, i.e. the cone type one with its nominal sealing surface of a cone frustum, or the sphere type with its nominal sealing surface of a zone of sphere. The sealing surface of the cone type of the flare of the present invention preferably has the same angle as existing ISO flares, i.e. of 115±2°. Thus, embodiments of both the cone type and the sphere type flares are such that each fits onto the seat of standard cone port per J1290. However, different sizes and angles can be utilized as long as both the seat and the flare correspond to each other.

When securing a connector having a cone type of the flare of the present invention, initial contact with the seat occurs at the borderline region between the lip and the sealing surface. Actual borderline shape is always a rounded edge (ideally portion of a torus). That difference to the nominal shape of circumference is due to the fillet radius between the die's lip and sealing surfaces. The borderline region is situated somewhat in the middle of the metal flow through the die during the endforming process. Entire available volume of this area gets filled regardless of minimum or maximum material conditions. Accordingly, the sizes are also expected to be exactly as the die commands. Thus, a smooth and predictable rounded edge can be expected there. Hence, the borderline region's rounded edge is not in any way an "as formed" area—contrary to the ISO flare end mentioned hereinabove. The probability of leak path occurrence due to a void at the edge is essentially zero. Since datum of the mating (i.e. the rounded edge of the borderline region) is smooth and predictable, the probability of locked misalignment is also essentially zero. Accordingly, full-scale self-adjusting capacity of the connector is available should a misalignment occur when there is not too much of external disturbance. It is the dramatically absolved from manufacturing process variation predictable and smooth mating datum, which provides the advantages of less sensitivity to defects and deviations in the connector, according to the present invention.

If the external disturbances exceed certain thresholds, then balance of the forces into the connector changes. Thus, the amount of torque, which was sufficient to engage the connector's self-adjustment without the disturbances, may become deficient to provide mutual motion of the components. Accordingly, an external disturbance leads to deterioration of the connector's self-adjustment capability. In this case, the rounded edge may become forced out of alignment with the seat's cone. That, in turn, leads to a single point initial contact, which may or may not be corrected by extra torque. In this case, a spherical shape of sealing surface helps to maintain circumference shaped initial contact. If much external disturbance is expected, the sphere type flare of the present invention is suitable. A sphere intersection with a cone is always a circle. Therefore, in the case of the zone of a sphere intersecting with a cone frustum it is possible to maintain circumferential-shaped initial contact within certain degrees of their misalignment.

However usage of a sphere-to-cone mating is also subject to disturbances, deviations and variations. Certain amount of self-adjustment may also be necessary if the actual degree of misalignment exceeds expected allowed level. In this case self-adjusting has to bring the situation (degree of misalignment) down to the acceptable level and only then to utilize the advantages of sphere-to-cone mating. Therefore, in order to utilize the known property of sphere-to-cone mating with respect to resistance to limited misalignment, the sensitivity to the second group of causes of sphere type flare of the present invention has to be the same or better in comparison with the cone type one. In extreme situations with excessive misalignment, initial contact in the sphere type flare may occur at the borderline region between the lip and spherical sealing surface. Depending on the actual shape of the lip, the borderline may take the form of either a rounded edge with a relatively small radius or a gradual transition area of a torus with a relatively large radius. In any case, a smooth and predicted borderline region is critical in the same way as in the cone type flare of the present invention. If there were no lip, then a small diameter of the zone of sphere becomes the flare end and, accordingly, becomes "as formed" area absorbing all the variations and deviations. Thus, the lip in the sphere type flare of the present invention is preferred for improved function of a connector having a sphere type flare according to the present invention is, thus, preferred for proper function of a connector having a sphere type flare, according to the present invention.

Each type of flare of the present invention has own niche of usage. The sphere type flare is prepared for external disturbances. For example, if a side force is unavoidable then the sphere type embodiment has an edge over the cone embodiment. Since the sphere type flare is resistant to certain degree of misalignment, the side force does not need to be overlapped by self-adjustment, if the misalignment degree is within expected operational limits. Thus, less torque is needed in order to seal such a connector because the ring of contact is already there and it only needs to be spread into adequate size. On the other hand, when external disturbances are not significant, the cone type embodiment of the flare according to the invention has an edge over the sphere type. No external disturbance usually means no misalignment or misalignment, which is easy to correct by self-adjustment. It is easier to develop proper size ring of contact onto an aligned cone-to-cone mating as the gap between the cone surfaces is less than one in sphere-to-cone case since the sphere surface has a curvature. Further, fewer gaps, in turn, require less securing torque to seal the joint.

In a further aspect, the invention provides an elongate tube having a flared end having a portion defining an abutment surface with a borderline region and selected from the group consisting of a spherical surface and a plurality of frustoconical surfaces, wherein said flared end of said elongate tube is adapted to be received within a connector body having a concave frustoconical seat to form a substantially rigid connection and a seal between said flared end of said elongate tube and said frustoconical seat of said connector body.

Preferably, the abutment surface of the flared end is a spherical surface combined with frustoconical lip or comprises a pair of frustoconical surfaces integrally formed at the borderline region.

Utilization of a sphere shaped external surface on the tube, which is intended to mate with a concave cone on the seat, provides a new method of forming a fluid-tight seal.

Thus, according to a further aspect of the present invention, there is provided a method of forming a substantially-rigid fluidic connection. The method comprises the initial steps of providing a connector body having a port with a concave conical end portion similar to the conical seat of a standard ISO port and providing an elongated tube having a flared end with its external abutment surface having its sealing surface shaped as a zone of sphere. The next step comprises inserting the tube into a connector body, followed by aligning the elongated tube in relation to the fluidic connector within an angular range and inserting a nut into the connector body so as to forcibly engage the sphere shaped flared end of the elongated tube to the cone end of the seat so as to form a fluidic seal.

In a further aspect of the present invention, the tube flared end is provided with coining to assure high surface quality and precision wherein both of the cone or sphere shaped sealing surface and the back face of the flare can be coined. Back face is the part of tube flared end. Back face provides abutment for the nut embracing and securing the tube in the connector.

By the term "coining" in the art and in this specification is meant a form of precision stamping. It is a typical process to produce coins, medallions and other products that requires the capability to reproduce very fine details. Coining is different from plain stamping in that enough pressure is utilized to enable plastic flow of the surface of the metal. Typically, a work piece is placed in a confined die and is squeezed during the process. Coining is a well-known and widely utilized surface conditioning process that produces a precise and smooth surface.

Thus, in a further aspect, the invention provides an elongate tube as hereinabove defined having at least one a coined flare's surface Accordingly, the invention provides an elongate tube as hereinabove defined having either the back face coined or the sealing surface or both.

The invention still further provides an assembly as hereinabove defined wherein said elongate tube either has its back face coined or the sealing surface or both.

The advantage of coining is to provide avoidance of twisting of the tube while being secured in the connector. When the securing torque is being applied onto the nut, it rotates or slides over the back face of the flare. Accordingly, a certain amount of torque gets transferred onto the elongated tube, via friction. The friction force between the sealing surfaces and the strength of the elongated tube in its rotational direction equalize that twisting torque. If the friction between the flare's back face and the nut is high enough to transfer the twisting torque, which is greater than the rotational tube's strength, then the tube's twist becomes highly probable. The friction between the sealing surfaces is expected to be low, since they have to be smooth, precise and predictable. The greater the difference between these two frictions, the more probable is to get a twisted tube. Contrariwise, if the frictions are the same then no twisting torque is transferred onto the tube as the frictions are balanced and cancel that torque. When at least the back face is coined, the frictions can be expected to be comparable. Accordingly, the propensity to get the tube twisted during securing of the connector in this case is low.

BRIEF DESCRIPTION OF THE DRAWINGS

In order that the invention may be better understood, preferred embodiments will now be described by way of example only, with reference to the accompanying drawings wherein.

DETAILED DESCRIPTION OF PREFERRED EMBODIMENTS

Figure 1:
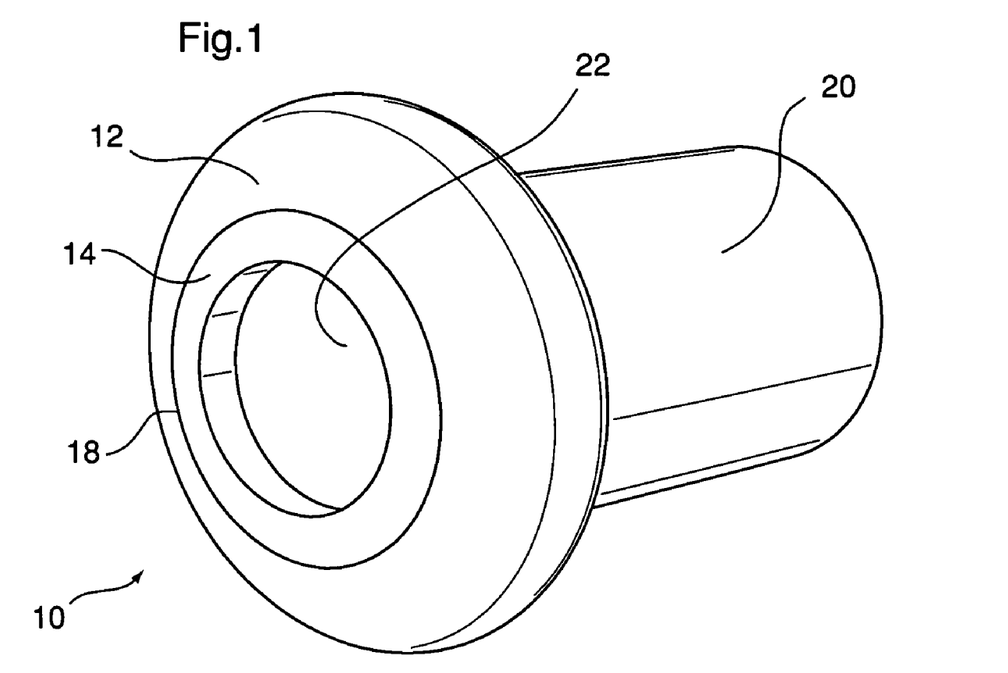
FIG. 1 is a front perspective view of an embodiment of a flare of the present invention.
Figure 2:
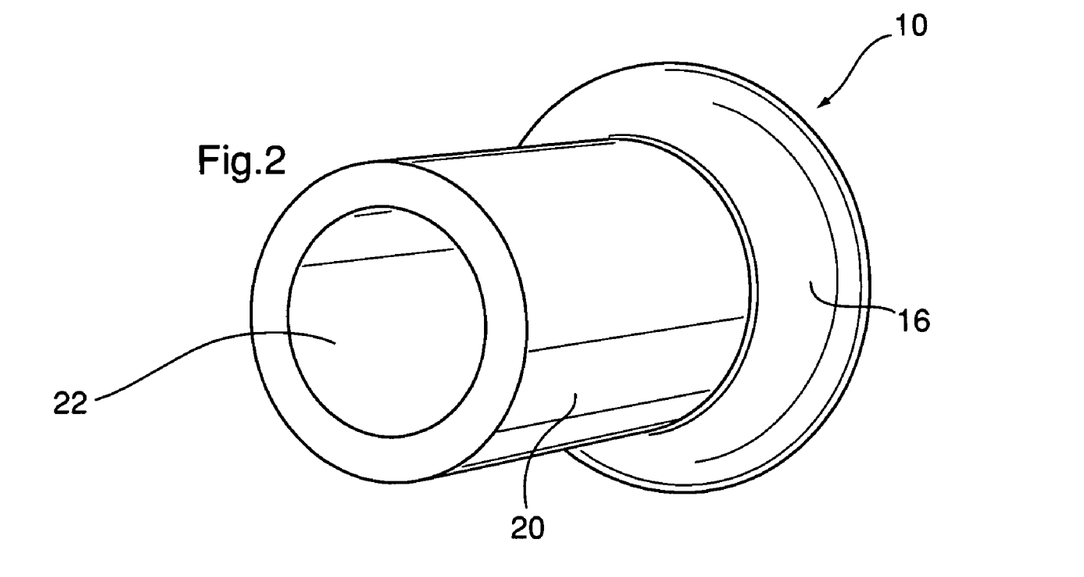
FIG. 2 is a rear perspective view of the embodiment of the flare in FIG. 1.
Figure 7:
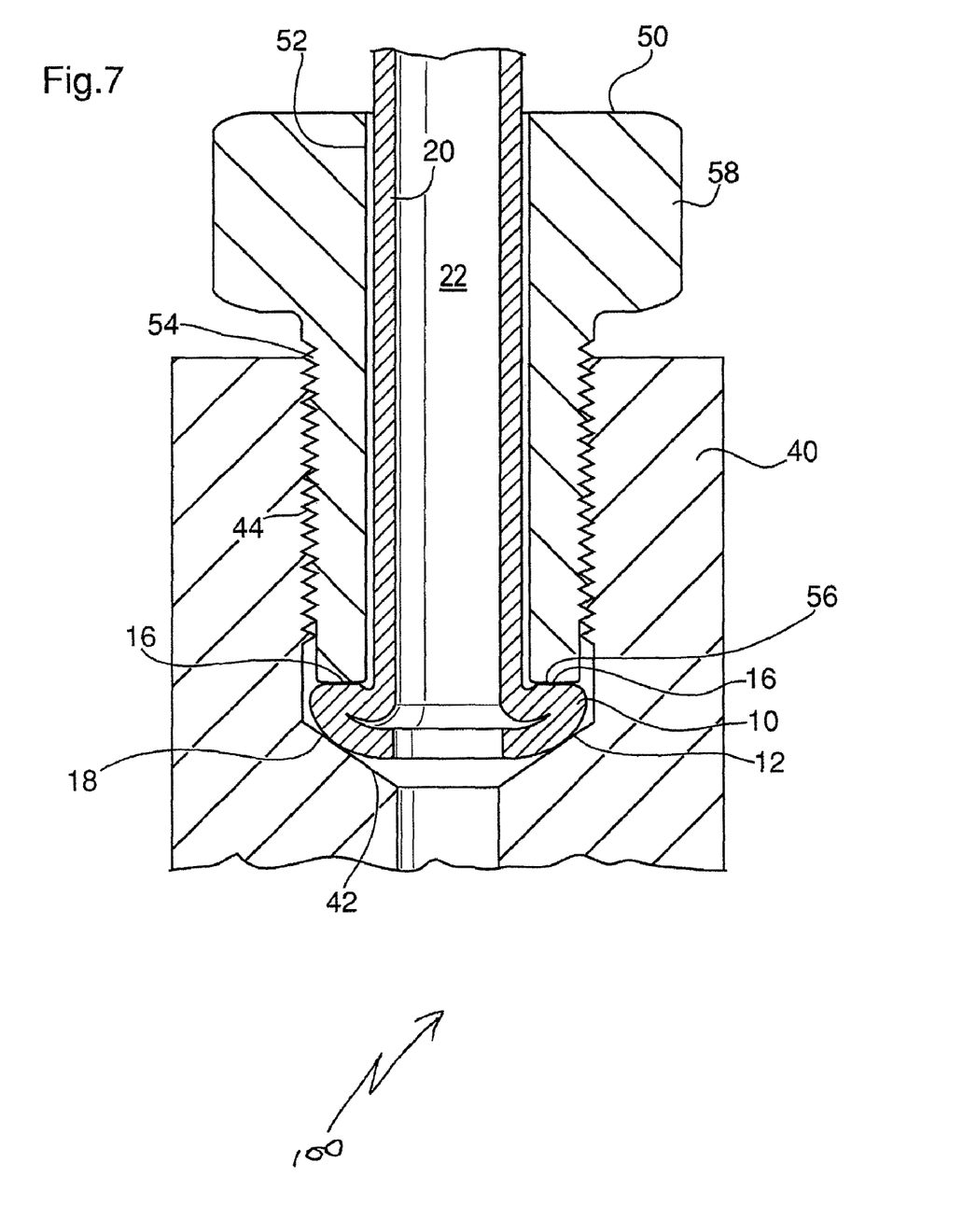
FIG. 7 is a cross sectional view of an embodiment of a coupling using the sphere type flare of the present invention and a cone port; and wherein the same numerals denote like parts.
Figure 8:
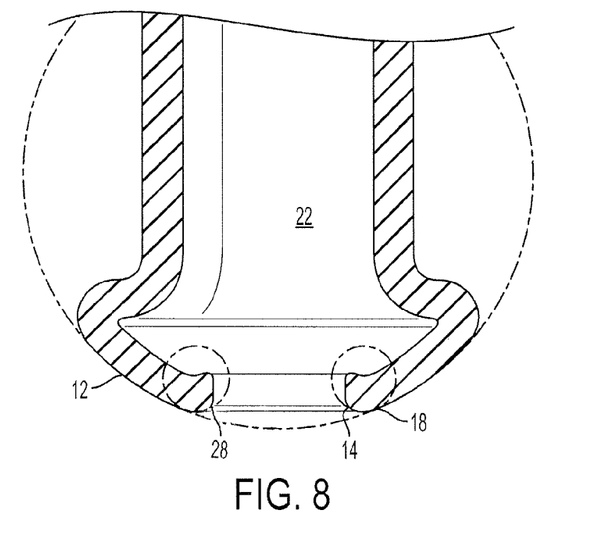
FIG. 8 is a cross sectional view of an embodiment of the sphere type flare with a lip including a torus surface, with a large dot-dashed circle showing the sphere, part of which defines the sealing surface, and with two small dot-dashed circles showing a cross section of the torus surface, part of which defines the lip area.
Figure 9:
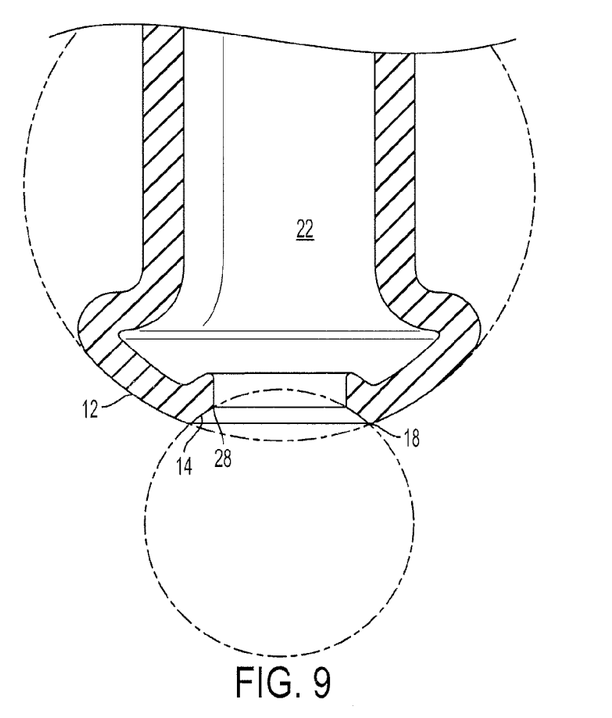
FIG. 9 is a cross sectional view of an embodiment of the sphere type flare with a lip area having a spherical surface, with a large dot-dashed circle showing the sphere, part of which defines the sealing surface, and with a smaller dot-dashed circle indicating a spherical surface defining the lip area.

FIGS. 1 and 2 show generally as 10 a flare of use in a brake tube connector coupling 100 in FIG. 7 of use in a motor vehicle (not shown). Flare 10 is an integral part of elongate tube 20 at an end thereof, but can also be formed at both ends of tube 20.

Flare 10 and tube 20 are preferably integrally formed of a single piece of metal material. In alternative embodiments, flare 10 may comprise multiple pieces or be composed of a non-metal material, either partially or entirely, which also may be coupled in a suitable manner, such as for example, welding, mating threads, and the like to tube 20. Tube 20 is preferably a prior art brake tube formed of any type of material, homogeneous or otherwise, sufficient for use in automotive braking applications or in any other similar application. Tube 20 may be integrally formed with a source of fluid or device, or also coupled to the fluid source or device by other methods, whether fixed or removable. Alternatively, tube 20 may be used in a similar application, such as, for example, connecting multiple conduits or branching a single fluid source to multiple destinations.

Flare 10 comprises a sealing surface 12, a lip area 14, a back face 16 and borderline region 18 between sealing surface 12 and lip area 14. Tube 20 also contains a passageway hole 22 throughout the entire length of tube 20. Passageway hole 22 is adapted to allow the passage of a fluid through a tube coupling arrangement (not shown). Flare 10, tube 20 and passageway 22 are preferably concentrically aligned such that they share a common central axis.

With reference to FIGS. 3, 4, 5 and 6, passageway hole 22 is defined by internal surface 24 of tube 20 and internal flare face 26. Internal flare face 26 is situated between internal surface 24 and flare end 28. Flare end 28 is the area where the end of passageway hole 22 meets lip area 14. Internal flare face 26 may take any shape suitable for realization of the endforming process which produces flare 10, providing that the size of passageway hole 22 remains of a sufficient size as to allow a required flow of fluid through elongated tube 20.

Figure 3:
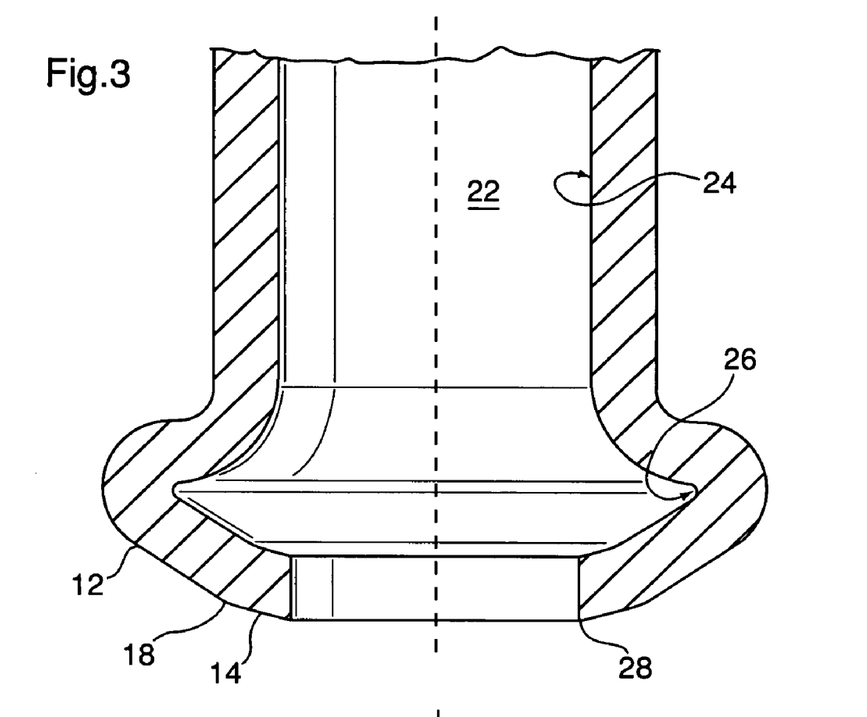
FIG. 3 is a cross sectional view of an embodiment of a cone type flare of the present invention.
Figure 4:
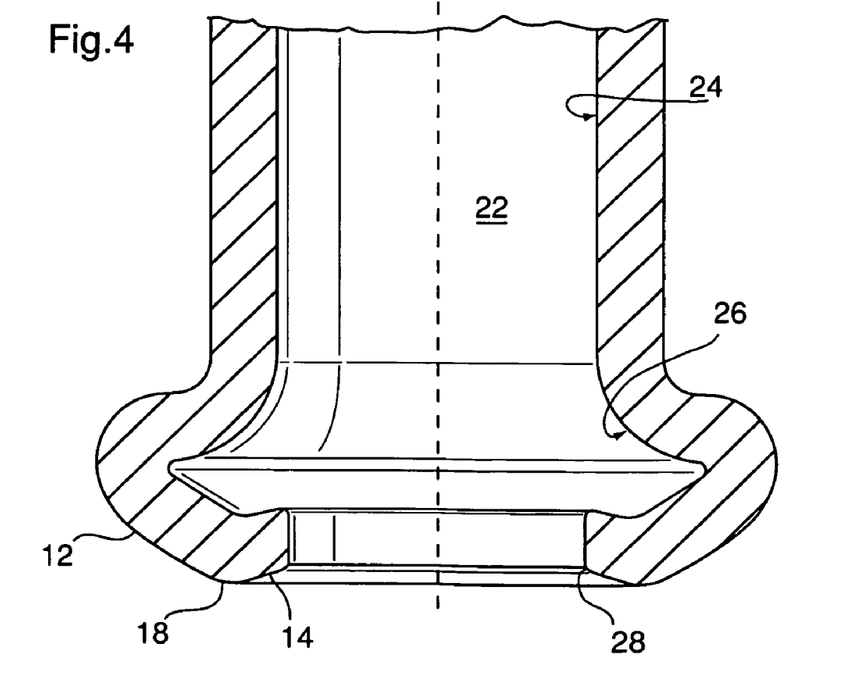
FIG. 4 is a cross sectional view of an embodiment of a sphere type flare of the present invention.
Figure 5:
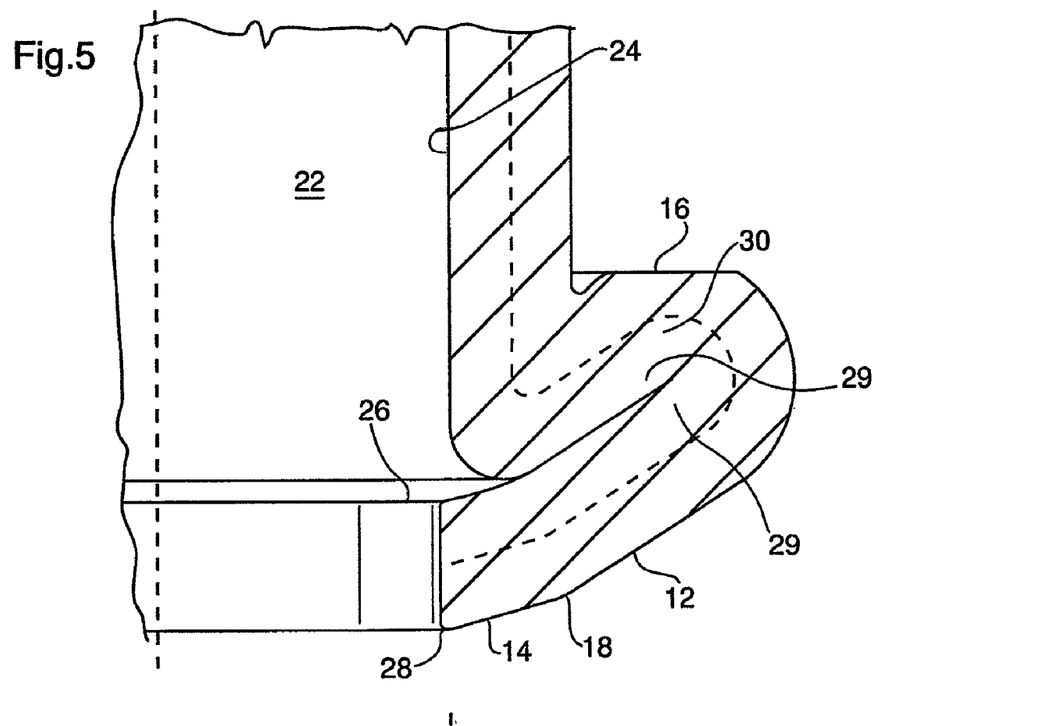
FIG. 5 is a semi-cross sectional view, in part, of an embodiment of the cone type flare of the present invention having coined sealing and back face surfaces.

FIGS. 3, 4, 5 and 6 illustrate different embodiments of the flare according to the present invention. FIG. 3 and FIG. 5 each show a cone type flare of the present invention, wherein FIG. 3 shows the cone type flare without usage of coining. The internal face of flare 10 of FIG. 3 is similar to that which exists in a standard ISO "bubble" flare. FIG. 5 illustrates a cone type of flare 10 of the present invention with both sealing surface 12 and back face 16 coined. The shape of internal face 26 of FIG. 5 is different from internal face 26 shown in FIG. 3. The embodiment shown in FIG. 5 is suitable for usage of coining because walls 29 of material body 30 are in intimate contact wherein the two layers of the initial material of tube have been "compressed" together during the late stages of the endforming process. Continuity of material body 30 between sealing surface 12 and back face 16 enables coining. Firmness of material body 30 provides a good mutual buttress between sealing surface 12 and back face 16 during the coining stage of the endforming process. A flat surface is shown to emphasize the impact of coining on flare's back face 16 in FIG. 5. Sealing surface 12 of cone type of flare 10 of the present invention preferably has the same angle of 115°±2° as an ISO flare. Therefore, preferred embodiments of the cone type of flare 10 can fit into the seat of a standard cone port per SAE standard J1290. However, different sizes and angles can also be utilized as long as both the seat and the flare correspond to each other.

Figure 6:
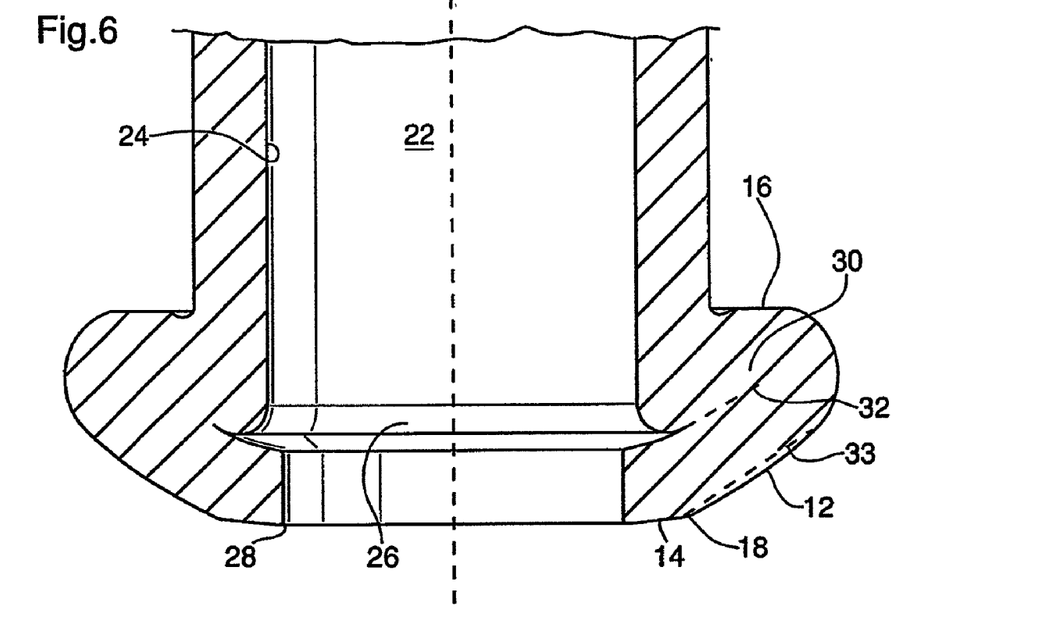
FIG. 6 is a cross sectional view, in part, of an embodiment of the sphere type flare of the present invention having coined sealing and back face surfaces.

FIGS. 4 and 6 show preferred embodiments of a sphere type flare 10 according to the present invention. The embodiment shown in FIG. 4 does not utilize coining. The embodiment shown in FIG. 6 has sealing surface 12 and back face 16 coined. Internal flare face 26 shown in FIGS. 4 and 6 are analogously different in the same way as was explained hereinabove in respect of FIGS. 3 and 5. The embodiment shown in FIG. 6 is suitable for coining incorporation as the material body 30 has continuity from sealing surface 12 to back face 16. Upper dashed line 32 at the right half of the cross-section describes a double layer of raw tube material 30. To emphasize the impact of coining onto back face 16 it is shown flat.

Since FIG. 6 shows an embodiment of the sphere type of flare 10, according to the invention, the cross section line representing sealing surface 12 is a portion of a large circle. The lower thin dashed line 33 in FIG. 6 denotes a cone type sealing surface and aims to help recognition of the difference between the sphere and the cone types of the flare of the present invention.

It should be noted that the shape of lip area 14 is similar in FIGS. 3 and 5, but different from lip area 14 shown in FIG. 4 and FIG. 6. This is to illustrate the fact that preferred embodiments of the lip can take many suitable shapes. A shape is suitable for the lip area 14 as long as it can support a circumference as the nominal shape of the borderline region with sealing surface 12. The lip area 14 can take the shape of a zone of a sphere, or portion of a torus, or a flat ring perpendicular to the axis of the tube; or for example, a complex combination of all of the above can be suitable. Lip 14 may also be bent "inside" passageway hole 22 as it shown in FIG. 4 providing the passageway of the hole remains sufficient to support required flow.

With reference now to FIG. 7, this shows a preferred embodiment of the method of forming a substantially rigid fluidic connection using a sphere type flare 10 of the present invention. The preferred embodiment of a coupling is a threaded connector having a body 40 adapted to receive elongated tube 20, such that the spherical sealing surface 12 of flare 10 and concave cone seat 42 of body 40 are engaged in a sealing relationship. Connector body 40 contains an internal thread 44. A nut 50 comprises a central bore 52, a threaded exterior portion 54 and abutting face 56 and a head portion 58. Central bore 52 passes entirely through nut 50 and is intended to accommodate elongated tube 20. Threaded exterior portion 54 and central bore 52 are concentric, and co-axial in sharing a common central axis. Head portion 58 is adapted to be driven by a fastening tool to allow the securing of connector 40. Both nut 50 and connector body 40 are preferably composed of a homogenous metallic material, but may also be composed of multiply pieces or another material, such as a plastics material. The surfaces of abutting face 56 and back face 16 are shown flat but could be of any suitable shape.

Nut 50 functions to hold sealing surface 12 of elongated tube 20 in sealing relationship with concave seat 42. Such holding is achieved via engagement of threaded portion 54 of nut 50 and body thread 44, which is enforced by an external torque applied onto head portion 58, which in turn forces contact between abutting face 56 and back face 16. The interaction defined by the conical shape of seat 42 and the zone of a sphere of sealing surface 12 provides for circumscribing, i.e. ring-shaped contact, through a range of annular alignments, thereby limiting leak path occurrence.

Modifications to embodiments of the invention described in the foregoing are possible without departing from the scope of the invention as defined by the accompanying clams. Expressions such as "including", "comprising", "incorporating", "consisting of", "have", "is" used to describe and claim the present invention are intended to be construed in a non-exclusive manner, namely allowing for items, components, or elements not explicitly described also to be present. Reference to the singular is also to be construed to relate to the plural.

Although this disclosure has described and illustrated certain preferred embodiments of the invention, it is to be understood that the invention is not restricted to those particular embodiments. Rather, the invention includes all embodiments, which are functional or mechanical equivalence of the specific embodiments and features that have been described and illustrated.

The invention claimed is:

1. A fluid automotive high-pressure brake tube connector assembly comprising:
    (a) a connector body having an inner seat having a portion defining a concave frustoconical surface;
    (b) a generally cylindrical elongate brake tube constructed and arranged for use in automotive braking applications, the elongate brake tube having a flared end with an external abutment surface, and a passageway hole extending along a longitudinal axis of the elongate brake tube; and
    (c) a nut;
    wherein said connector body is adapted to receive said elongate brake tube and said nut to form a substantially rigid connection, and wherein said flared end of said elongate brake tube and said concave frustoconical surface of said inner seat are engaged so as to form a fluid seal between said connector body and said elongate brake tube; and
    wherein said external abutment surface has a sealing surface mating with said concave frustoconical surface of said inner seat of said connector body; and
    wherein said external abutment surface of said flared end has a borderline region between a lip area and the sealing surface, said lip area being situated between said sealing surface and said passageway hole, and the entire sealing surface being defined by at least part of a surface of a sphere, a center of said sphere being generally positioned along the longitudinal axis of said elongate brake tube and said sphere having a diameter greater than an outer diameter of the elongate brake tube.

2. An assembly as claimed in claim 1, wherein the borderline region is a circumferential zone.

3. An assembly as claimed in claim 2, wherein the external abutment surface and the concave frustoconical surface meet at an angle.

4. An assembly as claimed in claim 1, wherein the external abutment surface and the concave frustoconical surface meet at an angle.

5. An assembly as claimed in claim 1, wherein said lip area is a frustoconical surface, a part of a spherical surface, a part of a torus surface, or a substantially flat surface generally perpendicular to said longitudinal axis of the elongate brake tube.

6. An assembly as claimed in claim 5, wherein said external abutment surface of said flared end comprises at least part of said surface of said sphere, defining said sealing surface, integrally formed at said borderline region with a frustoconical surface, defining said lip area.

7. An assembly as claimed in claim 1, wherein said lip area is a part of a spherical surface.

8. An assembly as claimed in claim 1, wherein said lip area is a part of a torus surface.

* * * * *